No. 740,069. PATENTED SEPT. 29, 1903.
W. O. WORTH.
VEHICLE TIRE.
APPLICATION FILED SEPT. 18, 1902.
NO MODEL.
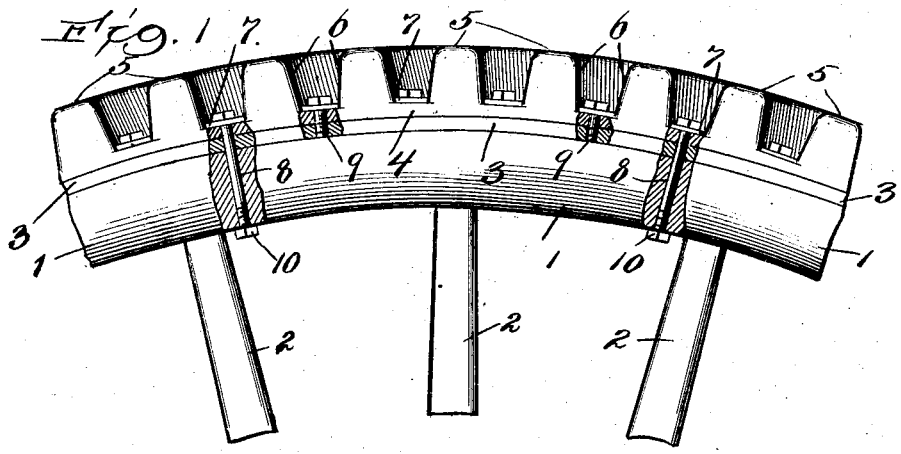
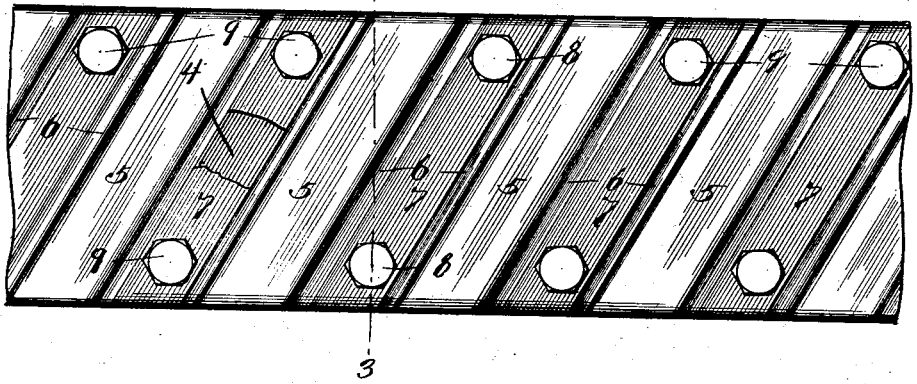
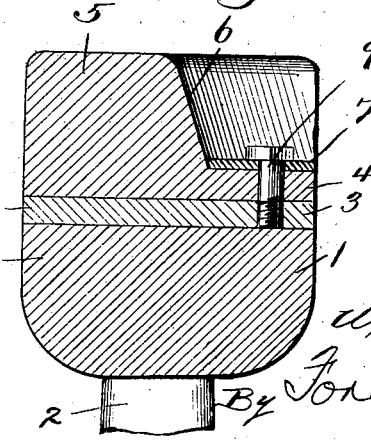
Witnesses: Inventor:
William O. Worth.

No. 740,069. Patented September 29, 1903.

UNITED STATES PATENT OFFICE.

WILLIAM O. WORTH, OF CHICAGO, ILLINOIS.

VEHICLE-TIRE.

SPECIFICATION forming part of Letters Patent No. 740,069, dated September 29, 1903.

Application filed September 18, 1902. Serial No. 123,880. (No model.)

*To all whom it may concern:*

Be it known that I, WILLIAM O. WORTH, of Chicago, in the county of Cook and State of Illinois, have invented certain new and useful Improvements in Vehicle-Tires; and I hereby declare that the following is a full, clear, and exact description thereof, reference being had to the accompanying drawings, which form part of this specification.

My invention relates to improvements in vehicle-tires, and particularly to solid, cushion, or resilient tires.

One of the objects of my invention is to provide a means for increasing the tractive force of a tire when used on a soft or slippery road-bed.

A further object is to provide means for attaching the tire to the rim which serve to strengthen the same and increase its durability.

With a view to attaining these and other objects, which will become apparent from the following description, my invention consists in the features of construction and arrangement thereinafter described, and pointed out in the claims.

In the drawings, Figure 1 is a side elevation of a fragment of a wheel equipped with my improved tire. Fig. 2 is an isometric plan of a section of said tire. Fig. 3 is a transverse section on line 3 3 of Fig. 2.

In the drawings, 1 represents the felly of a wheel, and 2 the spokes.

3 represents the usual metallic rim.

My improved tire comprises a relatively thin base 4 of uniform width and thickness and relatively thick transverse projecting ribs 5, formed integral with the exterior face thereof to constitute the tire-tread. The ribs 5 are obliquely disposed relative to the circumferential axis of the tire and may be arranged at any suitable angle or at any suitable distance apart. It is preferable that the ribs be so arranged that their aggregated peripheral surfaces present an unbroken or continuous tread to the roadway. The ribs 5 are preferably tapered from their bases to their peripheral surfaces, their inclined confronting faces being indicated at 6.

For the attachment of the tire reinforcing-plates 7 are provided, adapted to lie within the recesses between the ribs or projections 5 upon the base 4 and bear at their sides against the inclined sides 6 of the ribs. These plates are provided with apertures to receive suitable retaining-bolts 8 and 9.

8 represents bolts extending through the plates, tire, rim, and felly and secured by nuts 10 on the under side of the felly.

9 represents small bolts taking through the plates 7 and the tire-base and threaded into suitable apertures in the rim 3.

I prefer that only sufficiently long bolts 8 be employed to securely retain the rim 3 in place and that the intermediate plates 7 be secured by short bolts 9, as indicated in Fig. 1.

The tire thus described is intended particularly for self-propelling vehicles, and the effect of its structure will be apparent. When the vehicle is running upon a smooth hard surface, the peripheral or tread portions of the ribs only contact with the street, the diagonal arrangement of the ribs insuring that the tread-face of one or more ribs is always presented to the roadway. If, however, the vehicle encounters soft, sandy, or snow-covered roads, in which the driving-wheels are apt to slip, the weight of the vehicle causes the tire to sink therein, so that the surfaces 6 of the ribs may resist the slipping tendency and increase the tractive effect of the tire.

The tapered form of the ribs strengthens them at their bases and also tends to prevent the accumulation of the road-bed material in the recesses therebetween.

It will be apparent that slight changes might be made in the precise embodiment of my invention without departing from the spirit and scope thereof.

Having described my invention, what I claim as new and useful, and desire to secure by Letters Patent of the United States, is—

1. In a vehicle-tire, a body portion, resilient ribs projecting therefrom to form the tread, and reinforcing-plates coextensive with the space between the ribs, interposed between and bearing against the base of said ribs.

2. In a vehicle-tire, a body portion, transversely-disposed ribs arranged to form the tread thereof, separated reinforcing-plates arranged between the ribs upon the base, and means for retaining said plates in position.

3. In a vehicle-tire, a felly, a tire comprising a body, transversely-disposed integral ribs arranged to form the tread, rigid reinforcing-plates arranged between the ribs to bear upon the base and against the sides of the ribs, and bolts taking through the plates, base and felly to unite the same.

4. In combination with a wheel, a metal rim, a tire comprising a body, transversely-disposed ribs arranged to form the tread, reinforcing-plates arranged between the ribs to bear upon the base and against the sides of the ribs, and bolts uniting the plates with the rim.

In testimony that I claim the foregoing as my own I affix my signature in presence of two witnesses.

WILLIAM O. WORTH.

In presence of—
FORÉE BAIN,
MARY F. ALLEN.